Patented Mar. 23, 1937

2,074,494

UNITED STATES PATENT OFFICE 2,074,494

METHOD OF CONCENTRATING LATEX

Douglas Frank Twiss, Wylde Green, Birmingham, and Eric William Bower Owen, Erdington, Birmingham, England, assignors to Dunlop Rubber Company Limited, London, England, a British Company No Drawing. Application May 19, 1934, Serial No. 726,570. In Great Britain May 20, 1933

6 Claims. (Cl. 106—23)

This invention concerns improvements in or relating to the treatment of rubber latex and in particular concerns the production of concentrated india rubber latex.

The object of the present invention is to improve the method of concentrating rubber latex by centrifugal action whereby a more effective transfer is effected of the rubber globules into the cream fraction.

The invention is not only advantageous in that a greatly increased proportion of the rubber of the original latex is concentrated into the cream, but also in effecting a corresponding reduction with proportionate economy in the quantity of rubber collected in the form of skim.

The present invention can be used in connection with the centrifugal processes described in British Patents Nos. 219,635 and 319,410, and the concentrate produced by the present invention when treated in the customary manner with a latex preservative such as ammonia, can be transported safely for long distances to the industrial country where it will be found to be in a perfect state of preservation.

According to this invention the method of concentrating rubber latex by centrifugal action is characterized by controlling the temperature at which the centrifuging action is performed, by raising the temperature above 45° C. during the centrifugal action of separation and by maintaining or varying the temperature at or between a range of temperature between 45° C. and 85° C.

The concentrate obtained in accordance with this invention may be compounded with one or more of the usual compounding ingredients including filling agents, vulcanizing agents, accelerators, modifiers, and softeners, incorporated in the dry state or in the form of emulsion, and in the latter case the compounded product may be subject to evaporation in order to obtain further concentration of the compounded concentrates.

The following comparative data indicates how, working in accordance with the present invention, an improved separation of the rubber from rubber latex occurs when the rubber latex is centrifuged at an artificially elevated temperature, the experiments to which this data refers being made with a small experimental machine of a type already used on the plantations for the centrifugal concentration of Hevea latex.

Example I

Two portions drawn from the same bulk of latex are passed through the centrifuge under conditions as closely comparable as possible with the exception of the temperature of the fluid before introduction into the machine. One portion of the latex is at 18° C. ($a$) and the other at 60° C. ($b$). The results can be conveniently tabulated as follows:

|  | $a$ | $b$ |
|---|---|---|
| Temperature of latex | 18° C. | 60° C. |
| Volume of cream | 950 | 1250 |
| Volume of skim | 1150 | 600 |
| Percentage of rubber in cream | 57.0 | 55.3 |
| Percentage of rubber in skim | 28.2 | 22.7 |
| Percentage of original total solids issuing in the cream | 62.6 | 83.6 |
| Percentage of original total solids issuing in the skim | 37.4 | 16.4 |

It will be observed that at the higher temperature a considerably greater proportion of the rubber of the original latex is concentrated into the cream and a considerably smaller proportion of rubber is collected in the form of "skim".

Example II

In another experiment the results are as follows, and once more demonstrate the advantage of a higher temperature:

|  | $a$ | $b$ |
|---|---|---|
| Temperature of latex | 18° C. | 60° C. |
| Volume of cream | 250 | 1200 |
| Volume of skim | 1600 | 800 |
| Percentage of rubber in cream | 59.6 | 61.7 |
| Percentage of rubber in skim | 21.7 | 16.4 |
| Percentage of original total solids issuing in the cream | 30.0 | 85.0 |
| Percentage or original total solids issuing in the skim | 70.0 | 15.0 |

Example III

In this case the comparison is made between the degree of separation with the latex introduced at 47° C. and 77° C. respectively.

|  | $a$ | $b$ |
|---|---|---|
| Temperature of latex | 47° C. | 77° C. |
| Temperature of issuing cream | 40° | 60° |
| Temperature of issuing skim | 35° | 50° |
| Volume of cream | 800 | 1100 |
| Volume of skim | 900 | 600 |
| Percentage of rubber in cream | 65.1 | 61.0 |
| Percentage of rubber in skim | 35.8 | 16.2 |
| Percentage of original total solids issuing in the cream | 61.7 | 87.3 |
| Percentage of original total solids issuing in the skim | 38.3 | 12.7 |

What we claim is—

1. The method of concentrating latex which comprises raising the temperature above 45° C., and centrifugally separating the latex into cream and skim while at a temperature above 45° C.

2. The method of concentrating latex which comprises maintaining the temperature of the latex within a range of temperatures between 45° C. and 85° C., and centrifugally separating it into a cream and a skim while at said temperature.

3. The method of concentrating latex according to claim 1 characterized by the addition of known compounding ingredients.

4. A method of concentrating latex which comprises centrifugally separating it into cream and skim at a temperature between 45° C. and 85° C.

5. The method of concentrating latex which comprises heating the latex and centrifugally separating the latex into cream and skim while in a heated condition.

6. A method of concentrating latex which comprises centrifugally separating it into cream and skim at a temperature materially above normal atmospheric temperatures and not above 85° C.

DOUGLAS FRANK TWISS.
ERIC WILLIAM BOWER OWEN.